United States Patent [19]

Charsley

[11] 4,306,044
[45] Dec. 15, 1981

[54] CONTROL OF OLEFIN POLYMERIZATION

[75] Inventor: Philip Charsley, The Hague, Netherlands

[73] Assignee: Imperial Chemical Industries Limited, London, England

[21] Appl. No.: 109,917

[22] Filed: Jan. 7, 1980

Related U.S. Application Data

[63] Continuation of Ser. No. 946,060, Sep. 22, 1978, abandoned.

[30] Foreign Application Priority Data

Mar. 23, 1978 [GB] United Kingdom ............... 11676/78

[51] Int. Cl.$^3$ ................................................. C08F 2/38
[52] U.S. Cl. ......................................... 526/84; 526/61
[58] Field of Search .......................... 526/59, 60, 61, 84

[56] References Cited

U.S. PATENT DOCUMENTS 3,580,898  5/1971  Rosen ..................................... 526/60
4,105,842  8/1978  Nicco ..................................... 526/84
4,130,699  12/1978  Hoff ..................................... 526/84

FOREIGN PATENT DOCUMENTS 628272  2/1963  Belgium .
980264  1/1965  United Kingdom .

OTHER PUBLICATIONS

J. Mejzlik, Makromol Chem. 178, 261–266, 1977.
Chem. Abs., 72:13077, Pajda et al., 1969.

Primary Examiner—Paul R. Michl
Attorney, Agent, or Firm—Cushman, Darby & Cushman

[57] ABSTRACT

A gas-phase olefin polymerization system is provided with means for sensing a potentially dangerous condition and means for introducing carbon dioxide into the system to at least reduce the rate of polymerization. The system may be a stirred-bed system provided with means for automatically introducing carbon dioxide into the system in response to failure of the stirrer motor.

6 Claims, 1 Drawing Figure

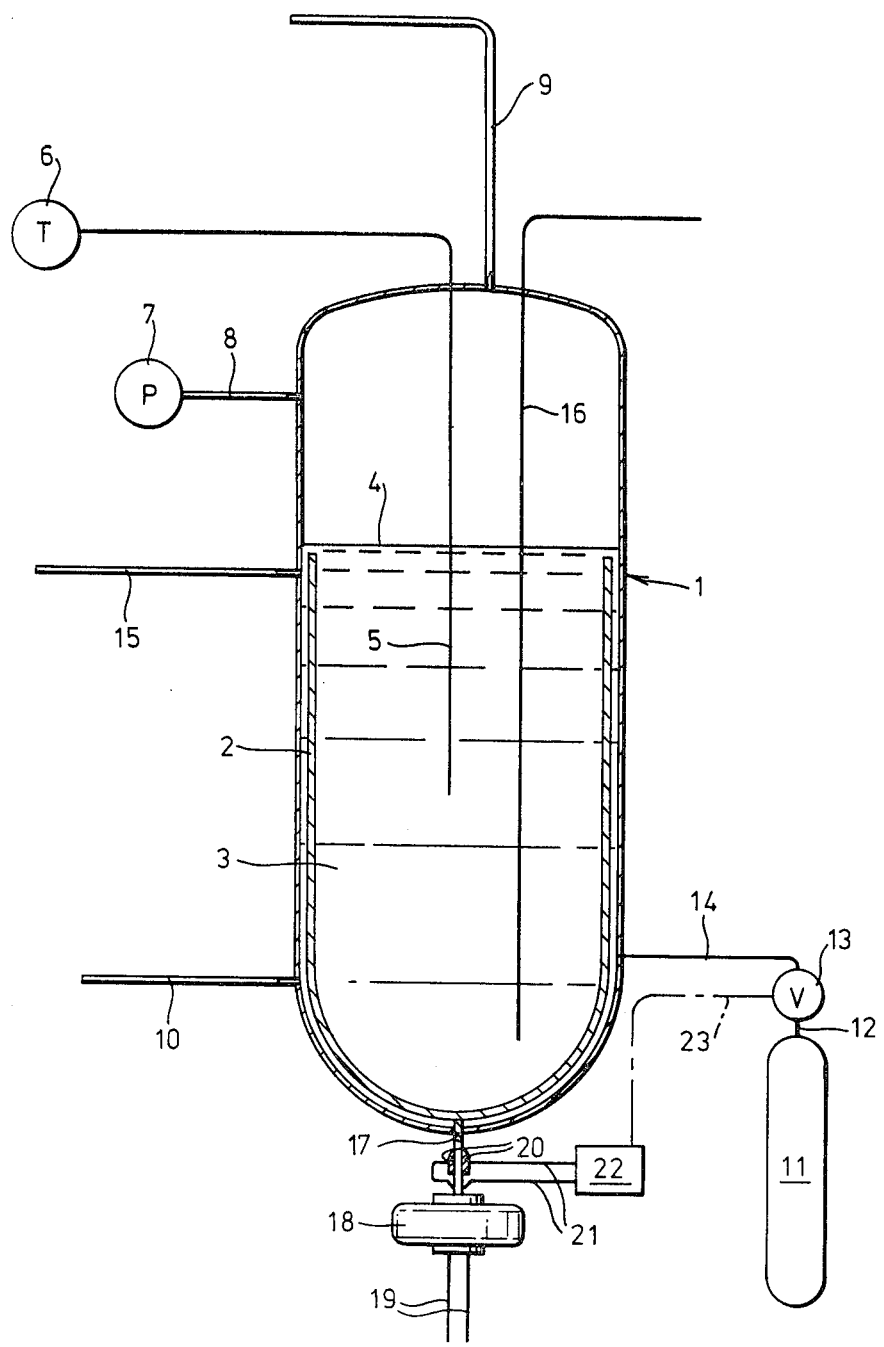

CONTROL OF OLEFIN POLYMERIZATION

This is a continuation of application Ser. No. 946,060 filed Sept. 22, 1978 now abandoned.

The present invention relates to the control of olefin polymerisations.

According to the present invention there is provided a gas-phase olefin polymerisation system including a gas-phase polymerisation reactor, means to detect, within the polymerisation reactor, an undesirable, or a potentially undesirable, reaction condition, a source of gaseous carbon dioxide and connecting means from said source of carbon dioxide to the polymerisation reactor.

The undesirable, or potentially undesirable, reaction condition is typically associated with run-away reaction conditions, particularly a rapid increase of temperature and/or pressure, which cannot be controlled by sufficiently rapid venting of the polymerisation reactor. If the gas-phase polymerisation is being effected using a stirred bed, a potentially undesirable condition may arise as a result of failure of the stirrer.

A high temperature, or failure of the stirrer, can lead to localised overheating of the polymer within the reaction bed with the consequential fusing of the polymer particles into a large mass which can be broken up only with great difficulty. It will be appreciated that the presence of such a fused mass has the result that the gas-phase polymerisation cannot be continued in a satisfactory manner.

In general, a temperature and/or pressure rise can be controlled either by controlling the rate of addition of the monomer or by controlled venting of the reactor. Only if these primary means of control fail is the carbon dioxide introduced into the polymerisation reactor. Thus, the addition of carbon dioxide is used only as a supplement, or back-up, to the normal control technique and hence the carbon dioxide addition typically is effected manually under such circumstances. If the polymerisation is being effected in a stirred-bed polymerisation reactor, overheating can occur rapidly on failure of the stirrer and thus it is desirable to pass the carbon dioxide into the stirred bed automatically on failure of the stirrer.

The effect of the carbon dioxide is to at least reduce the rate of polymerisation and, if a sufficient quantity of carbon dioxide is added, the polymerisation reaction is quenched.

As a preferred aspect of the present invention the polymerisation system includes a stirred-bed, gas-phase polymerisation reactor, detection means to detect failure of rotation of the stirrer, a source of gaseous carbon dioxide, connecting means from said source of carbon dioxide to the polymerisation reactor, valve means within said connecting means and means effective to open said valve means in response to a signal from the detection means on failure of rotation of the stirrer.

The means for detecting an excessive pressure within the polymerisation reactor may be a pressure-sensitive switch, a pressure gauge or a transducer, and any of these means may have associated with them means for recording pressure variations and visual and/or audible alarms.

An excessive temperature within the polymerisation reactor is conveniently monitored using a thermocouple which is preferably located in, or near, the centre of the polymer bed. The thermocouple may be associated with means for recording temperature variations and possibly visual and/or audible alarms.

Failure of the stirrer in a stirred-bed reaction vessel may be detected by an electrical signal from the motor driving the stirrer or by monitoring the rate of rotation of the stirrer shaft. The electrical signal from the motor will indicate an increase or decrease in the power requirement of the motor, a substantial decrease in, or total loss of, power to the motor indicating failure of the supply or the motor, whilst a substantial increase in the power requirement of the motor indicates either the formation of polymer lumps in the polymerisation reactor or mechanical fouling of the stirrer. The preferred method of detecting failure of the stirrer is by monitoring the rate of rotation of the stirrer shaft, for example using a motion switch on the stirrer shaft. Any of the various means of detecting failure of the stirrer may be associated with means for recording variations in the power requirement of the motor or the rate of rotation of the stirrer shaft and these recording means may also be connected to visual and/or audible alarms.

The means to detect an undesirable, or potentially undesirable, reaction condition is conveniently arranged to automatically activate suitable means for correcting this undesirable reaction condition.

As a further aspect of the present invention there is provided a process for operating a gas-phase olefin polymerisation process which comprises monitoring the process for undesirable, or potentially undesirable, reaction conditions and, when such reaction conditions are detected, introducing a quantity of carbon dioxide into the polymerisation reactor which quantity is sufficient to at least reduce the rate of the polymerisation reaction.

The quantity of carbon dioxide required to quench the polymerisation reaction will depend on a number of factors, particularly the quantity of polymerisation catalyst present. As is well known, olefin monomers can be polymerised using catalyst systems based on compounds of transition metals. Such catalyst systems are typically a mixture of an inorganic compound of a transition metal together with an organo-metallic compound of a non-transition metal but, particularly for the polymerisation of ethylene, other catalyst systems may be used, for example an oxide of a transition metal on a suitable support or an organic compound of a transition metal on a support. We have found that effective quenching can be achieved by the addition of carbon dioxide in an amount of at least five times, on a molar basis, relative to the total effective catalyst system. The term "total effective catalyst system" is used herein to include not only the transition metal compound but also any organo-metallic compound of a non-transition metal which is present in the catalyst system.

We have found that the polymerisation reaction can be quenched within a short period of time from introducing the carbon dioxide into the polymerisation reactor, but this is dependent on the size of the polymerisation reactor and also, when the undesirable condition is failure of the stirrer for some reason, the rate at which the carbon dioxide diffuses through the polymer bed under the conditions within the reactor. The rate at which the carbon dioxide diffuses through the bed can be increased by providing a plurality of injection points for carbon dioxide within the polymerisation reactor. These injection points may be arranged around the circumference of the polymerisation reactor, or may be located at various heights within the polymerisation reactor, or may be arranged both around the circumference and at various heights within the reactor. In a polymerisation reactor having a bed volume of 20 liters, we have found that, even with the stirrer not operating, the polymerisation reaction can be quenched within five minutes, for example three minutes, of introducing the carbon dioxide through a single injection point. However, in a larger reactor, the quenching time will be increased.

The present invention will now be further described by reference to the accompanying drawing which is a diagrammatic representation of a polymerisation system in accordance with the invention.

Referring to the drawing, a polymerisation reaction vessel 1 is provided with an agitator 2 located within a bed 3 of particles of polypropylene containing active polymerisation catalyst, the top of the bed 3 being indicated at 4.

A thermocouple 5 is located within the bed 3 of particles of polypropylene and is connected to a temperature gauge 6. A pressure switch 7 is connected to the vessel 1 by a connector pipe 8. A gas outlet pipe 9 is located at the top of the vessel 1 and a monomer inlet pipe 10 is located near the base of the vessel 1.

A gas cylinder 11, which contains carbon dioxide, is connected through a pipe 12 to a valve 13 which is connected through a pipe 14 to the vessel 1. The valve 13 is adapted for manual operation and also for automatic operation by means of a motor drive (not shown). The vessel 1 is also provided with a catalyst injector pipe 15 and a dip-leg 16 which acts as a polymer removal conduit.

The agitator 2 is mounted on a drive shaft 17 which passes through the base of the vessel 1 to an electric motor 18. The power supply to the motor 18 is indicated generally by the leads 19. A motion switch 20 is connected to the drive shaft 17 and the switch 20 is connected through the leads 21 to a relay 22. The relay 22 is connected to the valve 13 through a lead 23.

In operation, liquid propylene is continuously supplied to the vessel 1 through the pipe 10 and gaseous propylene is continuously withdrawn through the pipe 9. This gaseous propylene may be filtered to remove entrained polymer particles, cooled and liquefied and then recycled to the pipe 10 (all by means not shown). The agitator 2 is rotated to maintain the bed in a sufficiently agitated condition. A suspension in liquid propylene of a titanium trihalide-containing material is introduced into the vessel 1 through the pipe 15. An organo-aluminium compound is introduced into the liquid propylene which is recycled to the pipe 10. The polymer product is withdrawn through the dip-leg 16.

If, during the polymerisation, the temperature and/or pressure rises, this will be registered by gauge 6 and/or switch 7 respectively. If the temperature or pressure rise is excessive and does not respond to other means of control, the valve 13 is operated manually to release carbon dioxide into the vessel 1 to quench the polymerisation reaction.

If there is a decrease in the rate of rotation of the agitator 2 for any reason, this will be detected by the motion switch 20 and if the rate of rotation falls below a predetermined level, the switch 20 operates to send a signal through the leads 21 to the relay 22. The relay 22 responds by passing a signal along the lead 23 which causes the valve 13 to open automatically and release carbon dioxide into the vessel 1 to quench the polymerisation reaction.

Once the polymerisation has been quenched the valve 13 is closed. When the cause of the undesired reaction conditions has been removed or rectified, without admitting any other catalyst poisons, such as oxygen or water vapour, into the vessel 1, polymerisation may be resumed merely by purging the vessel 1 with propylene (which is not recycled) until the carbon dioxide is removed from the vessel 1 at which stage the polymerisation can be restarted.

It will be appreciated that the polymerisation can be effected in the presence of hydrogen which is added to control the molecular weight of the product. The relay 22 can be adjusted to give a time delay, for example from 30 seconds up to one minute, between receiving the signal from the switch 20 and passing a signal to the valve 13. Other variations to the apparatus or process will be apparent to the skilled worker and such variations may be effected without departing from the scope of the present invention as described herein.

The process of the present invention is illustrated by the following Examples.

EXAMPLE 1

Into a water jacketed, 8 liter stainless steel autoclave fitted with an anchor-shaped stirrer was charged 400 g of polypropylene powder. The autoclave was heated to 70°C., evacuated and propylene gas added to give a pressure of 20 psi gauge. The autoclave was evacuated and propylene gas added a total of six times over a period of 20 minutes.

The excess propylene pressure was released, the stirrer started and 6.7 millimoles of diethyl aluminium chloride as a 1.0 M solution in heptane added. After ten minutes, 0.67 millimole of titanium trichloride was added as a suspension in heptane.

Ten minutes after the addition of the titanium trichloride, the autoclave was pressurised, in stages, to 400 psi gauge with propylene. At pressures of 100, 200, 300 and 400 psi gauge, 20 millimole portions of hydrogen were added. The pressure was maintained at 400 psi gauge by the addition of propylene and the temperature was maintained at 70° C. 10 millimoles of hydrogen were added after the addition of each 200 ml of propylene, the propylene being added by the distillation of liquid propylene.

1.5 hours after attaining the pressure of 400 psi gauge, the propylene monomer supply was turned off and carbon dioxide was then added to the top of the autoclave giving a total pressure of 405 psi gauge. The carbon dioxide addition was 95 millimoles of carbon dioxide which represents 13 moles of carbon dioxide for each mole of the total effective catalyst system.

No consumption of propylene was noted after the carbon dioxide injection, indicating that the polymerisation had been quenched, this being supported by the difference in cooling requirements before and after injecting the carbon dioxide. The polymer product obtained was free flowing and free from lumps.

EXAMPLE 2

The procedure of Example 1 was repeated with the exception that the stirrer was stopped just before adding the carbon dioxide. The result obtained was similar to that obtained in Example 1, thus demonstrating that the carbon dioxide had caused a sufficiently rapid quenching of the polymerisation to prevent significant lump formation, even when the stirrer was not operating.

EXAMPLE 3

The procedure of Example 1 was repeated on a larger scale in an autoclave having a capacity of 170 liters. The autoclave contained an initial charge of 4 kg of polypropylene powder. 52.5 millimoles of diethyl aluminium chloride and 7.5 millimoles of titanium trichloride were used as the catalyst system and polymerisation was effected at a temperature in the range 70° C. to 75° C., and a pressure of 300 psi gauge. Carbon dioxide was added directly into the polymer bed using a dip-leg.

The propylene supply was turned off after about 60 minutes polymerisation time, and then 300 millimoles of carbon dioxide were added, with the stirrer still operating, and whilst maintaining constant the temperature of the cooling water being circulated through the cooling jacket of the autoclave. Prior to the addition of the carbon dioxide, the temperature of the polymer bed was increasing steadily (about 3° C. over 45 minutes) but on the addition of the carbon dioxide no further temperature rise occurred and then the temperature started to decrease showing that quenching of the polymerisation had resulted.

The molar quantity of carbon dioxide used was five times the molar quantity of the total effective catalyst system. There was no indication that any lump formation had occurred in the polymer.

EXAMPLE 4

The process of Example 3 was repeated using an initial charge of 9 kg of polypropylene powder, 150 millimoles of diethyl aluminium chloride, 35 millimoles of titanium trichloride and a pressure of 400 psi gauge. Under these conditions, a rapid rate of polymerisation occurred as indicated by a rapid rise in the temperature of the autoclave contents (at least 10° C. in 45 minutes). The propylene supply was turned off, the stirrer was stopped and then about 3 moles of carbon dioxide were introduced into the autoclave to give a pressure rise from 400 psi gauge up to 410 psi gauge.

A rapid fall in the temperature of the autoclave contents was noted (about 8° C. in 15 minutes) showing that the polymerisation had been quenched.

There was no indication from the polymer product that any build-up or lump formation had occurred after the stirrer was stopped.

COMPARATIVE EXAMPLE A

The procedure of Example 4 was repeated using an initial charge of 12 kg of polypropylene powder, 150 millimoles of diethyl aluminium chloride and 20 millimoles of titanium trichloride.

The propylene supply was turned off, the stirrer was stopped and 50 ml (1250 millimoles) of methanol were added. A drop in the temperature of the vessel contents was noted but when the polymer product was inspected it was found to be in the form of a fused lump formed after the stirrer had been stopped.

I claim:

1. A gas-phase olefin polymerisation system including a gas-phase polymerisation reactor, means to detect, within the polymerisation reactor, an undesirable, or a potentially undesirable, reaction condition, a source of gaseous carbon dioxide, means connecting said source of carbon dioxide to the polymerisation reactor, means for maintaining said source of carbon dioxide disconnected from the reactor during normal operation of the polymerisation reaction and means operative by said detecting means to connect said carbon dioxide source to said reactor to automatically introduce carbon dioxide into the reactor only upon detecting said undesirable, or potentially undesirable, reaction condition and to thereby at least reduce the rate of polymerisation, the polymerisation reactor being provided with a stirrer to effect stirring of powder within the polymerisation reactor and said detecting means including means to detect failure of rotation of the stirrer as an indication of the undesirable, or potentially undesirable, reaction condition.

2. The system of claim 1 which includes valve means within the said connecting means and means effective to open said valve means in response to a signal from the detection means on failure of rotation of the stirrer.

3. The system of claim 1 wherein the means to detect failure of rotation of the stirrer is a motion switch on the stirrer shaft.

4. A process of operating a gas-phase olefin polymerisation process which comprises monitoring the process in order to detect undesirable, or potentially undesirable, reaction conditions, operating said process in the absence of carbon dioxide as long as said undesirable or potentially undesirable reaction conditions do not occur, continuing the polymerisation until said undesirable or potentially undesirable reaction conditions are detected, and then introducing a quantity of carbon dioxide into the polymerisation reactor which quantity is sufficient to at least reduce the rate of the polymerisation reaction.

5. The process of claim 4 wherein carbon dioxide is added in an amount of at least five times, on a molar basis, the total effective catalyst system.

6. The process of claim 4 wherein carbon dioxide is added from 30 seconds up to one minute after detecting the undesirable, or potentially undesirable, reaction conditions.

* * * * *